Sept. 8, 1970         R. L. ALLEN         3,527,544
COOLED BLADE SHROUD
Filed Dec. 12, 1968

INVENTOR.
Robert L. Allen
BY
Paul Fitzpatrick
ATTORNEY

United States Patent Office 3,527,544
Patented Sept. 8, 1970

3,527,544
COOLED BLADE SHROUD
Robert L. Allen, Greenwood, Ind., assignor to General Motors Corporation, Detroit, Mich., a corporation of Delaware
Filed Dec. 12, 1968, Ser. No. 783,178
Int. Cl. F01d 5/22
U.S. Cl. 416—90        15 Claims

ABSTRACT OF THE DISCLOSURE

A turbine has air-cooled blades with hollow blade tip shrouds on the blades. The shrouds are defined by inner and outer walls between which air is admitted from a passage extending spanwise of the blades. The inner and outer walls and edges of the shroud have air discharge openings of controlled size and distribution.

---

The invention herein described was made in the course of work under a contract or subcontract thereunder with the Department of Defense.

My invention relates to turbines and particularly to improved structure for cooling the blade tip shrouds of high temperature turbines.

It has long been realized that one approach to improving the efficiency of turbines in such devices as gas turbine engines lies in cooling the structures which are particularly exposed to high temperature motive fluid so as to make possible higher cycle temperatures. It is necessary, of course, to make efficient use of the cooling air since energy is required to supply it under pressure to the turbine and ordinarily most of this energy is lost.

Many of the proposals for cooling turbines include rotors with hollow blades and with some form of cooling air circulation through the blades. My present invention is directed primarily to providing a feasible and efficient structure by which blade tip shrouds may be provided on the blades and by which such blade tip shrouds may be adequately cooled. Such shrouds are desirable to minimize leakage of motive fluid past the blade tips and in some cases to damp blade vibration or minimize blade twist.

To some extent, the preferred structure of my present invention resembles those of my prior patent application Ser. No. 601,196 for Cooled Seal Ring, filed Dec. 12, 1966, now Pat. No. 3,411,794, of common ownership with this application, which discloses structure by which cooling air is distributed from a porous laminated structure of the stationary part of an interstage seal of a turbine. However, there are significant differences between the structure disclosed in the prior application and that involved here.

The principal objects of my invention are to improve the efficiency of gas turbine engines, to reduce leakage in high temperature turbines, to provide means for cooling a blade tip shroud of a high temperature turbine, and to provide a blade tip shroud structure of high strength and light weight and with improved and efficient structure for cooling the shroud.

The nature of my invention and its advantages will be apparent to those skilled in the art from the succeeding detailed description of the preferred embodiment of the invention and the accompanying drawings therein.

Figure 1:
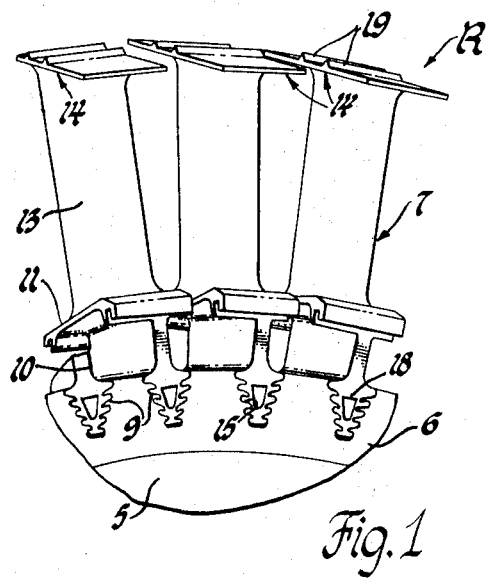
FIG. 1 is a fragmentary axonometric view of an air-cooled turbine rotor embodying my invention.
Figure 2:
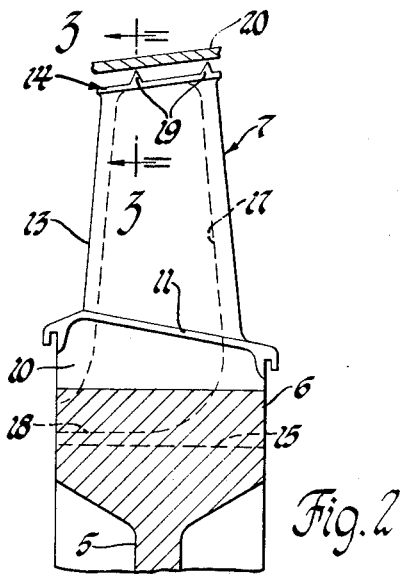
FIG. 2 is a sectional view of the rim portion of the rotor and blade ring taken on a plane containing the axis of the rotor.

FIGS. 1 and 2 illustrate turbine structure which, so far as it appears in these figures, may be regarded as conventional. A turbine rotor R comprises a wheel 5 having a rim 6 on which are mounted blades 7. Each blade comprises a root or base 9, a stalk 10, a platform 11, an airfoil or blade portion proper 13, and a blade tip shroud 14. Each root 9 is suitably fixed or attached to the rim 6 of the wheel as, for example, by a multiple dovetail or fir tree attachment in a suitably formed blade slot 15 extending across the rim of the wheel. The blade 7 defines a passage 17 for cooling air from an air entrance 18 in the root to the tip of the blade at the shroud 14.

The platforms 11 of the blades are in contact at their side edges so that the platforms define the inner boundary of the motive fluid path through the rotor stage. The blade tip shrouds 14 likewise are in contact, or substantially in contact, so as to define the outer boundary of the motive fluid path. The shrouds may be in rubbing contact to damp vibration of the blade or increase rigidity if desired. The shrouds 14 bear knife edges 19 which are aligned to define an essentially continuous pair of labyrinth seal ridges around the outer surface of the ring of shroud segments 14. These cooperate with the wall 20 of the turbine case to provide a labyrinth seal minimizing bypassing of the blade tips by the motive fluid.

Figure 3:
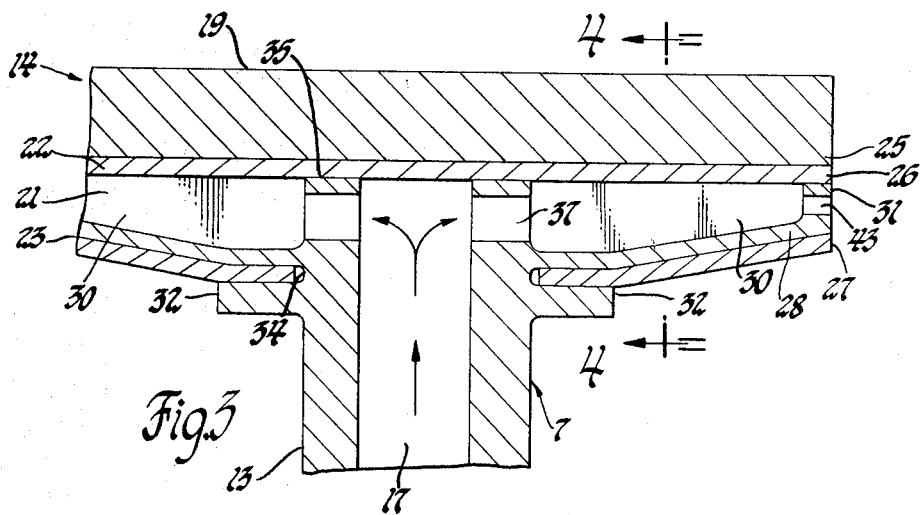
FIG. 3 is an enlarged sectional view of a blade tip and shroud taken on the plane indicated by the line 3—3 in FIG. 2.
Figure 4:
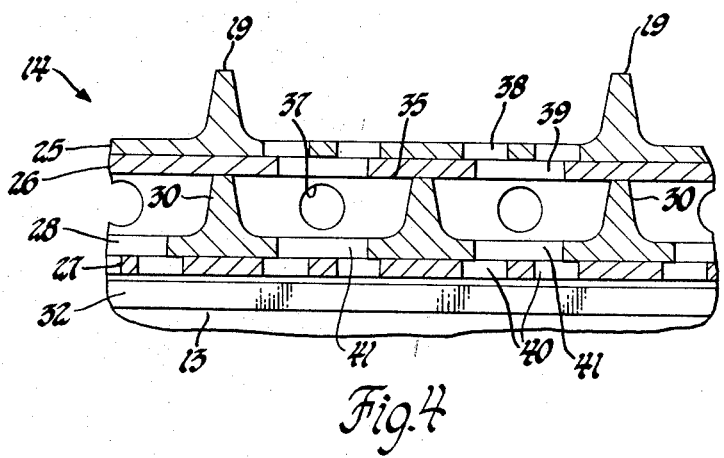
FIG. 4 is a sectional view of the same taken on the plane indicated by the line 4—4 in FIG. 3.

The preferred structure of the blade tip shroud 14 is shown in FIGS. 3 and 4. The shroud is a hollow structure defining an interior space or spaces 21 between a radially outer wall 22 and a radially inner wall 23. The knife edges 19 are defined by ridges extending from the outer wall 22. Both the outer and inner walls are made of two layers laminated together, the outer wall comprising a radially outer exterior sheet 25 and a radially inner interior sheet 26. The inner wall comprises a radially inner exterior sheet 27 and a radially outer interior sheet 28. The interior sheet 28 bears a number of ridges 30 extending circumferentially of the rotor into contact with the interior sheet 26. Sheet 28 terminates in an edge wall 31 at the edge of the blade shroud. Wall 28, ridges 30, and edge wall 31 are integral parts of the blade, cast or otherwise formed with the airfoil 13. The airfoil 13 also bears a flange 32 extending from each face of the blade. In practice, the flanges 32 may be cast integral with the sheet 28. When the blade is machined, a chordwise extending slot 34 is cut separating the flange 32 from sheet 28 and providing space to receive the edge of sheet 27.

The sheet 27 is fixed to sheet 28 of flange 32 by any suitable process such as diffusion bonding, and sheets 25 and 26 are bonded together and bonded to the tip 35 of the blade and the outer surface of ridges 30 by any suitable process such as diffusion bonding. The result is that the entire structure becomes a unitary one.

Proceeding now to the circulation and distribution of a cooling air within the shroud; as previously pointed out, the air flows radially outwardly through the passage 17 in the airfoil and it is discharged out both faces of the blade into the space 21 through holes 37 in both faces of the blade adjacent the tip 35.

The two sheets 25 and 26 which make up the outer wall and the two sheets 27 and 28 which make up the inner wall are provided with distributed discharge openings or holes through which the air admitted from the blade passage 17 may flow to the inner and outer surfaces of the shroud. As illustrated, there are holes 38 in sheets 25 and holes 39 in sheets 26, which overlap holes 38 to provide through air passages. Similarly, there are holes 40 in sheet 27 and holes 41 in sheet 28. The size and distribution and amount of overlap of these holes may be adjusted to suit desires as to the amount of cooling air which is to flow through the outer and inner face of the shroud and its distribution, and to minimize unnecessary weight.

Air flowing through the inner wall 23 may provide a cooling film between that wall of the shroud and the motive fluid. Air flowing through the outer wall 22 may serve a similar function and additionally provide a blocking layer of air within the labyrinth seal defined by the ridges 19 and the cooperating stator structure 20. The holes 38 to 41 may be made in any suitable manner; for example, by photoetching or chemical machining, depending upon the nature of material and the thickness of the sheet. The layout of the holes may follow the principles of overlap to control flow and minimize weight described in my prior application Ser. No. 601,196 previously referred to.

It may also be desirable to exhaust a small amount of air through the side edges of the blade tip shrouds where they abut or confront adjacent shrouds. This may be accomplished by one or more discharge openings 43 in the edge wall 31.

It will be apparent to those skilled in the art that structure according to my invention provides a lightweight strong structure well adapted to distribute cooling air to maintain the blade tip shroud at a sufficiently low temperature with minimal waste of cooling air. It also exhausts airfoil cooling air into the turbine with a minimum of disturbance of the motive fluid.

The detailed description of the preferred embodiment of the invention for the purpose of explaining the principles thereof is not to be considered as limiting or restricting the invention, as many modifications may be made by the exercise of skill in the art.

What is claimed is:

1. A hollow gas-cooled turbine blade including a blade-tip shroud segment extending from the faces of the blade at the blade tip to provide an outer boundary of fluid flow past the blade and provide a motive fluid seal in cooperation with turbine case structure, the blade tip shroud being hollow and open to the interior of the blade and the blade defining a path for cooling gas through the blade into the shroud, the shroud having radially outer and inner walls, at least one of said walls being of a porous structure with numerous gas discharge holes distributed over the surface of said wall to provide a film of gas over the exterior of said one wall discharged through the openings.

2. A blade as recited in claim 1 in which the discharge holes are provided in the outer surface of the shroud.

3. A blade as recited in claim 1 in which the discharge holes are provided in the inner surface of the shroud.

4. A blade as recited in claim 3 in which the discharge holes are provided in the outer surface of the shroud.

5. A blade as recited in claim 1 in which the surface of the shroud is laminated of two sheets.

6. A blade as recited in claim 5 in which the discharge holes are defined by holes in the laminated sheets only partially in register.

7. A blade as recited in claim 5 in which the shroud has outer and inner walls connected by ridges on the inner wall.

8. A turbine blade having a cooled blade tip shroud comprising, in combination, an airfoil defining an interior passage extending spanwise of the airfoil, an inner shroud wall extending from the faces of the airfoil adjacent the tip, and an outer shroud wall extending from the faces of the airfoil at the tip, the inner shroud wall including integral flanges, the outer shroud wall being bonded to the said flanges and the blade tip, the airfoil having an inlet for cooling fluid and outlet means for the fluid connected to the space between the shroud walls, at least one shroud wall defining distributed discharge holes for the fluid.

9. A blade as recited in claim 8 in which the inner wall is at least partially integral with the blade.

10. A blade as recited in claim 8 in which the said shroud walls are laminated of two sheets.

11. A blade as recited in claim 10 in which the discharge holes are defined by holes in the laminated sheets only partially in register.

12. A blade as recited in claim 8 in which the discharge holes are provided in the outer wall of the shroud.

13. A blade as recited in claim 8 in which the discharge holes are provided in the inner wall of the shroud.

14. A blade as recited in claim 13 in which the discharge holes are provided in the outer wall of the shroud.

15. A blade as recited in claim 8 in which the outer shroud wall includes labyrinth sealing ridges.

References Cited
UNITED STATES PATENTS

| | | |
|---|---|---|
| 3,182,955 | 5/1965 | Hyde. |
| 3,290,004 | 12/1966 | Ishibashi. |
| 3,411,794 | 11/1968 | Allen. |
| 3,433,015 | 3/1969 | Sneeden. |
| 3,446,481 | 5/1969 | Kydd. |

EVERETTE A. POWELL JR., Primary Examiner

U.S. Cl. X.R.

416—191, 192